United States Patent
Fujii

(10) Patent No.: US 11,433,482 B2
(45) Date of Patent: Sep. 6, 2022

(54) ADDITIVE MANUFACTURING APPARATUS

(71) Applicant: Mitsubishi Electric Corporation, Tokyo (JP)

(72) Inventor: Takafumi Fujii, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/606,051

(22) PCT Filed: Jul. 8, 2019

(86) PCT No.: PCT/JP2019/027021
§ 371 (c)(1),
(2) Date: Oct. 25, 2021

(87) PCT Pub. No.: WO2021/005690
PCT Pub. Date: Jan. 14, 2021

(65) Prior Publication Data
US 2022/0143751 A1 May 12, 2022

(51) Int. Cl.
*B23K 26/342* (2014.01)
*B23K 9/04* (2006.01)
(Continued)

(52) U.S. Cl.
CPC .............. *B23K 26/342* (2015.10); *B23K 9/04* (2013.01); *B23K 9/16* (2013.01); *B23K 26/348* (2015.10); *B33Y 30/00* (2014.12)

(58) Field of Classification Search
None
See application file for complete search history.

(56) References Cited

U.S. PATENT DOCUMENTS 6,526,327 B2 * 2/2003 Kar ........................ B33Y 70/00
700/98
10,639,714 B2 * 5/2020 Dariavach .......... B23K 26/0648
(Continued)

FOREIGN PATENT DOCUMENTS

CN 101362256 A 2/2009
JP 57-156876 A 9/1982
(Continued)

OTHER PUBLICATIONS

International Search Report and Written Opinion dated Oct. 8, 2019, received for PCT Application PCT/JP2019/027021, Filed on Jul. 8, 2019, 9 pages including English Translation.
(Continued)

*Primary Examiner* — Geoffrey S Evans
(74) *Attorney, Agent, or Firm* — Xsensus LLP

(57) ABSTRACT

An additive manufacturing apparatus forms layers with a material that is molten to produce a formed object. The additive manufacturing apparatus includes a CMT power supply that supplies as a power supply current to heat a wire that is the material fed to a workpiece, to the material; a laser oscillator that produces as a beam source a laser beam that is a beam with which the workpiece is irradiated; and a head drive unit that shifts as a drive unit a feed position for the material on the workpiece and an irradiation position for the beam on the workpiece. The additive manufacturing apparatus shifts the feed position and the irradiation position, with the irradiation position leading in a moving path for the feed position in spaced relation to the feed position.

5 Claims, 9 Drawing Sheets

(51) Int. Cl.
    *B23K 9/16*    (2006.01)
    *B23K 26/348*    (2014.01)
    *B33Y 30/00*    (2015.01)

(56) References Cited

U.S. PATENT DOCUMENTS

| | | | | |
|---|---|---|---|---|
| 2015/0209905 A1* | 7/2015 | Matthews | ............... | B23K 9/173 |
| | | | | 219/76.14 |
| 2015/0209908 A1* | 7/2015 | Peters | .................... | B23K 26/34 |
| | | | | 219/76.14 |
| 2015/0209913 A1 | 7/2015 | Denney et al. | | |
| 2016/0318130 A1* | 11/2016 | Stempfer | ................ | B23K 9/125 |
| 2017/0136579 A1* | 5/2017 | Wagner | ................ | B23K 26/702 |
| 2018/0021887 A1* | 1/2018 | Liu | .................... | B23K 26/0626 |
| | | | | 219/121.75 |
| 2019/0184486 A1 | 6/2019 | Flamm et al. | | |
| 2019/0366466 A1* | 12/2019 | Hutchison | .............. | B33Y 30/00 |

FOREIGN PATENT DOCUMENTS

| | | |
|---|---|---|
| JP | 2004-17059 A | 1/2004 |
| JP | 2016-179501 A | 10/2016 |
| JP | 2019-81187 A | 5/2019 |
| JP | 2019-107698 A | 7/2019 |

OTHER PUBLICATIONS

Decision to Grant dated May 19, 2020, received for JP Application 2020-505927, 5 pages including English Translation.

* cited by examiner

ADDITIVE MANUFACTURING APPARATUS

CROSS-REFERENCE TO RELATED APPLICATION

The present application is based on PCT filing PCT/JP2019/027021, filed Jul. 8, 2019, the entire contents of which are incorporated herein by reference.

FIELD

The present invention relates to an additive manufacturing apparatus that forms layers with a molten material to produce a formed object.

BACKGROUND

Arc welding is known to be used in an additive manufacturing method of layering beads formed of a molten material to produce a formed object. Additive manufacturing using arc welding has problems such as a low processing speed and difficulty of higher precision forming. Accordingly, an additive manufacturing technique that has been developed for enabling accelerated processing and higher precision forming uses a beam in addition to an arc.

An additive manufacturing apparatus disclosed in Patent Literature 1 heats a workpiece by laser beam irradiation and heats a wire serving as a material by passing current through the wire. According to Patent Literature 1, the additive manufacturing apparatus forms a molten pool on a surface of the workpiece by the laser beam irradiation and then feeds the heated wire to the molten pool. As a molten droplet of the wire contacts the molten pool, the molten wire is added to the workpiece. The additive manufacturing apparatus described in Patent Literature 1 repeats this operation to form a bead on the surface of the workpiece.

CITATION LIST

Patent Literature

Patent Literature 1: Japanese Patent Application Laid-open No. 2016-179501

SUMMARY

Technical Problem

With the above technique described in Patent Literature 1, the laser beam irradiation that is used to form the molten pool increases heat input to the workpiece, so that a formed object will have sizable strains due to thermal shrinkage after forming. The formed object will have reduced form accuracy, and therefore, higher precision forming is difficult.

The present invention has been made in view of the above, and an object of the present invention is to obtain an additive manufacturing apparatus that is capable of higher precision forming.

Solution to Problem

In order to solve the above-stated problem and achieve the object, an additive manufacturing apparatus according to the present invention forms layers with a material that is molten to produce a formed object. The additive manufacturing apparatus according to the present invention includes: a power supply to supply a current to the material, the current being used for heating the material that is fed to a workpiece; a beam source to produce a beam with which the workpiece is irradiated; and a drive unit to shift a feed position for the material on the workpiece and an irradiation position for the beam on the workpiece. The additive manufacturing apparatus according to the present invention shifts the feed position and the irradiation position, with the irradiation position leading in a moving path for the feed position in spaced relation to the feed position.

Advantageous Effect of Invention

The additive manufacturing apparatus according to the present invention produces an effect where it is possible to perform higher precision forming.

DESCRIPTION OF EMBODIMENTS

With reference to the drawings, a detailed description is hereinafter provided of additive manufacturing apparatuses according to embodiments of the present invention. It is to be noted that these embodiments are not restrictive of the present invention.

First Embodiment

Figure 1:
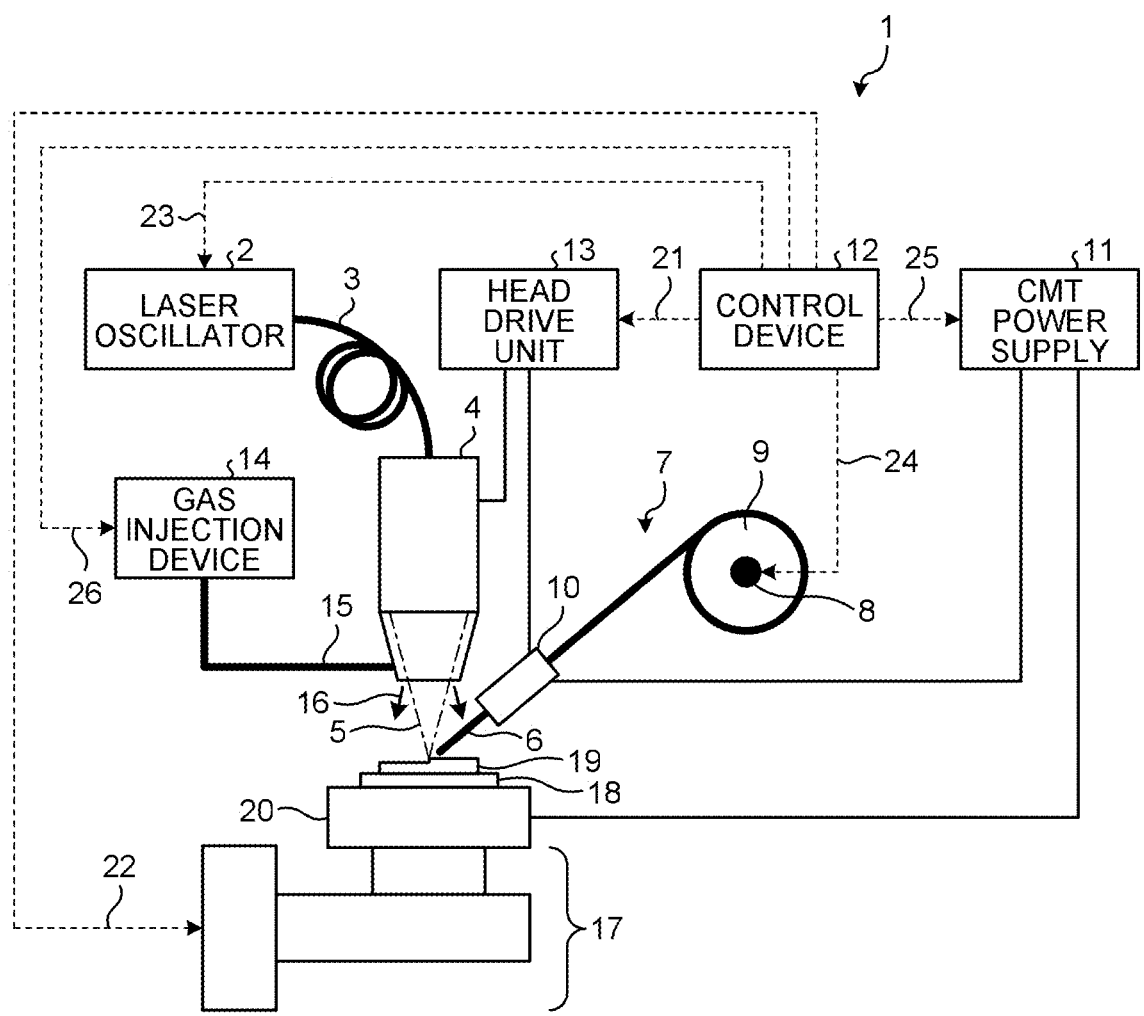
FIG. 1 is a diagram schematically illustrating a configuration of an additive manufacturing apparatus according to a first embodiment of the present invention.

FIG. 1 is a diagram schematically illustrating a configuration of an additive manufacturing apparatus according to a first embodiment of the present invention. The additive manufacturing apparatus 1 refers to a machine tool that forms layers with a molten material to produce a formed object. The additive manufacturing apparatus 1 performs additive manufacturing that uses arc welding and beam irradiation.

The additive manufacturing apparatus 1 feeds a wire 6 serving as a material to a workpiece and layers, on a base material 18, beads formed of the material that has been melted. By layering the beads on the base material 18, the additive manufacturing apparatus 1 builds a formed object 19 on the base material 18. The base material 18 is placed on a stage 20. In the first embodiment, the workpiece is an object to which a molten material is added and refers to the base material 18 and the formed object 19. The base material 18 illustrated in FIG. 1 is a plate. The base material 18 may be a material other than the plate.

The additive manufacturing apparatus 1 includes a laser oscillator 2 that serves as a beam source. The laser oscillator 2 produces a laser beam 5 with which the workpiece is irradiated. The laser beam 5 propagates to a machining head 4 through a fiber cable 3 that serves as an optical transmission path. The machining head 4 emits the laser beam 5 toward the workpiece.

The additive manufacturing apparatus 1 includes a feed mechanism 7 that feeds the wire 6 to the workpiece. A wire spool 9 from which the wire 6 is supplied is wound with the wire 6. The feed mechanism 7 includes a rotary motor 8 that rotates the wire spool 9, and a contact tip 10 through which the wire 6 from the wire spool 9 is passed. The rotary motor 8 is driven to cause the wire 6 to be fed from the wire spool 9 to the workpiece and is driven to cause the fed wire 6 to be retracted to the wire spool 9.

The additive manufacturing apparatus 1 includes a Cold Metal Transfer (CMT) power supply 11 that is a power supply that supplies, to the wire 6, current to heat the wire 6 that is fed to the workpiece. The CMT power supply 11 is connected to the contact tip 10 and the stage 20. When the contact tip 10 is in contact with the wire 6, the CMT power supply 11 is electrically connected to the wire 6. When the stage 20 is in contact with the base material 18, the CMT power supply 11 is electrically connected to the workpiece. The CMT power supply 11 applies a pulse voltage between the wire 6 and the workpiece.

When the wire 6 is moved away from the workpiece, an arc results from the pulse voltage being applied by the CMT power supply 11. The CMT power supply 11 controls current such that the current increases when a short circuit between the wire 6 and the workpiece is cleared compared to when the short circuit is established between the wire 6 and the workpiece. The CMT power supply 11 also heats the wire 6 by passing the current through the wire 6.

The additive manufacturing apparatus 1 includes a gas injection device 14 that provides a gas 16 to be injected to the workpiece. The gas 16 from the gas injection device 14 flows through a pipe 15 to the machining head 4 and is injected to the workpiece from a gas nozzle in the machining head 4. The gas nozzle is not illustrated in FIG. 1. By injecting the gas 16, the additive manufacturing apparatus 1 prevents or reduces oxidation of the formed object 19 and cools the bead(s).

The additive manufacturing apparatus 1 includes a head drive unit 13 that moves as a drive unit the machining head 4 and the contact tip 10. The head drive unit 13 refers to a motion mechanism that provides translational motion along each of three axes. The head drive unit 13 shifts a feed position for the wire 6 on the workpiece and an irradiation position for the laser beam 5 on the workpiece. In the first embodiment, the additive manufacturing apparatus 1 shifts the feed position and the irradiation position, with the irradiation position leading in a moving path for the feed position in spaced relation to the feed position, i.e., while being apart from the feed position.

The additive manufacturing apparatus 1 includes rotating shafts 17 that serve as a motion mechanism to provide rotation about each of two axes. The rotating shafts 17 rotate the stage 20. The additive manufacturing apparatus 1 is capable of causing the workpiece to assume a position suitable for processing by rotating the workpiece along with the stage 20.

The additive manufacturing apparatus 1 includes a control device 12 that controls the entire additive manufacturing apparatus 1. The control device 12 controls the head drive unit 13 by outputting an axis command 21 to the head drive unit 13. The control device 12 controls the rotating shafts 17 by outputting a rotation command 22 to the rotating shafts 17. The control device 12 controls the laser oscillator 2 by outputting a laser output command 23 to the laser oscillator 2. The control device 12 controls the rotary motor 8 by outputting a feed command 24 to the rotary motor 8. The control device 12 controls the CMT power supply 11 by outputting a power command 25 to the CMT power supply 11. The control device 12 controls the gas injection device 14 by outputting a gas supply command 26 to the gas injection device 14.

The wire 6 of the additive manufacturing apparatus 1 illustrated in FIG. 1 is fed obliquely relative to a direction of the laser beam 5 that is emitted from the machining head 4. The wire 6 of the additive manufacturing apparatus 1 may be fed in the same direction as the direction in which the laser beam 5 is emitted. The additive manufacturing apparatus 1 may use a beam other than the laser beam 5, such as an electron beam, for irradiation in performing additive manufacturing.

Figure 2:
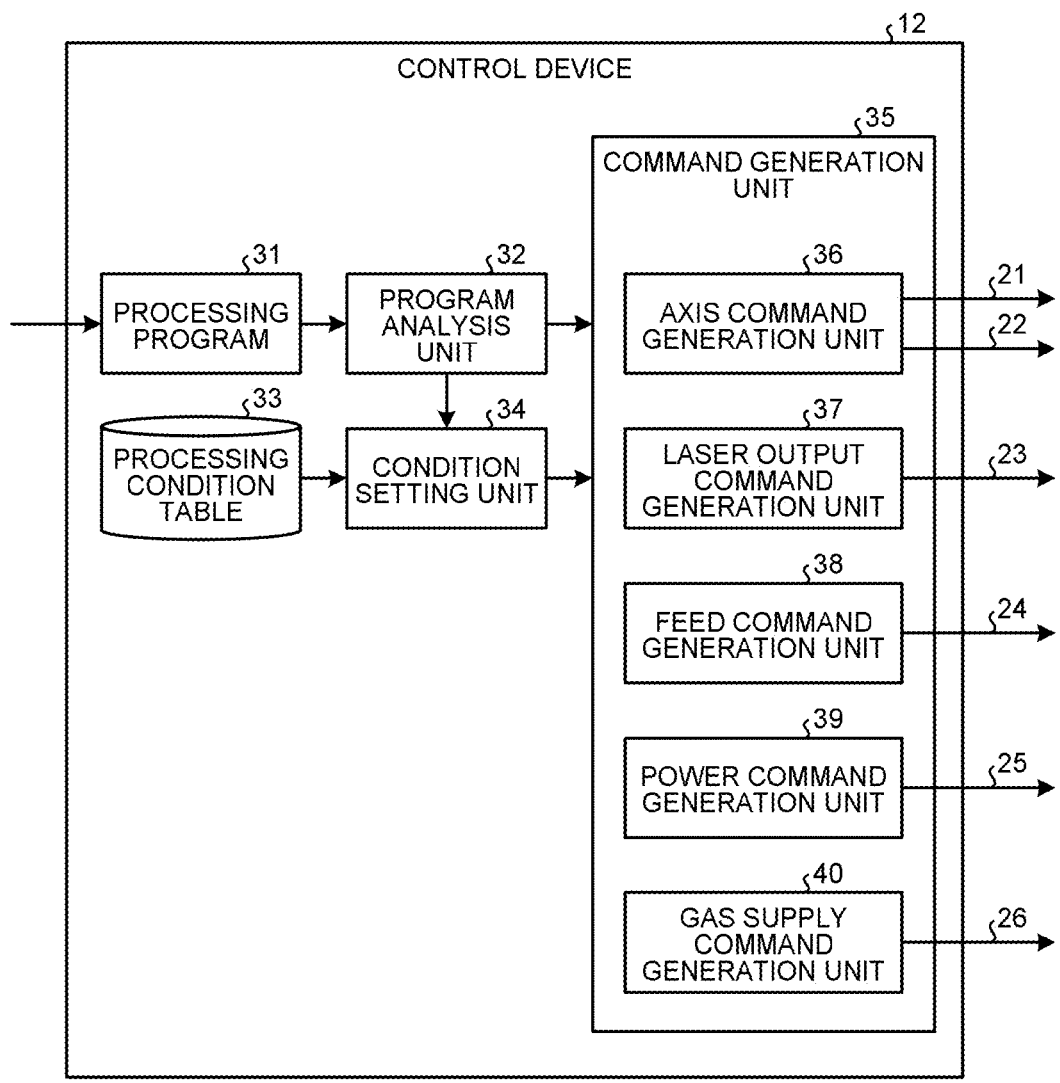
FIG. 2 is a diagram illustrating a function configuration of a control device included in the additive manufacturing apparatus illustrated in FIG. 1.

FIG. 2 is a diagram illustrating a function configuration of the control device included in the additive manufacturing apparatus illustrated in FIG. 1. A processing program 31 is input to the control device 12. The processing program 31 is a numerical control (NC) program created by a computer-aided manufacturing (CAM) device. The control device 12 includes a processing condition table 33 storing data on various processing conditions. The processing program 31 includes an instruction for selection of processing conditions from among the processing conditions stored in the processing condition table 33.

The control device 12 includes a program analysis unit 32 that analyzes the processing program 31, a condition setting unit 34 that sets the processing conditions, and a command generation unit 35. On the basis of processing contents described in the processing program 31, the program analysis unit 32 analyzes the moving path along which the feed position is to be shifted. The program analysis unit 32 outputs data on the analyzed moving path to the command generation unit 35.

The program analysis unit 32 obtains from the processing program 31 and outputs to the condition setting unit 34 information specifying the processing conditions. On the basis of the information from the program analysis unit 32, the condition setting unit 34 reads data on the processing conditions specified in the processing program 31 from the processing condition table 33. In this way, the condition setting unit 34 sets the processing conditions for additive manufacturing. The condition setting unit 34 outputs the data on the processing conditions that have been set to the command generation unit 35.

The control device 12 may obtain the data on the specified processing conditions from the processing program 31, which includes a description of the data on the processing conditions, instead of from among the prestored data on the various processing conditions in the processing condition table 33. In that case, the program analysis unit 32 of the control device 12 obtains the data on the processing conditions by analyzing the processing program 31.

The command generation unit 35 includes an axis command generation unit 36 that generates the axis command 21 and the rotation command 22, a laser output command generation unit 37 that generates the laser output command 23, a feed command generation unit 38 that generates the feed command 24, a power command generation unit 39 that generates the power command 25, and a gas supply command generation unit 40 that generates the gas supply command 26. The axis command generation unit 36 generates the axis command 21 based on the data on the moving path. The axis command generation unit 36 generates the rotation command 22 according to instructions in the processing program 31. The axis command generation unit 36 outputs the generated axis command 21 to the head drive unit 13. The axis command generation unit 36 outputs the generated rotation command 22 to the rotating shafts 17.

The laser output command generation unit 37 generates the laser output command 23 in accordance with the processing conditions and outputs the generated laser output command 23 to the laser oscillator 2. The feed command generation unit 38 generates the feed command 24 in accordance with the processing conditions and outputs the generated feed command 24 to the rotary motor 8. The power command generation unit 39 generates the power command 25 in accordance with the processing conditions and outputs the generated power command 25 to the CMT power supply 11. The gas supply command generation unit 40 generates the gas supply command 26 in accordance with the processing conditions and outputs the generated gas supply command 26 to the gas injection device 14.

Figure 3:
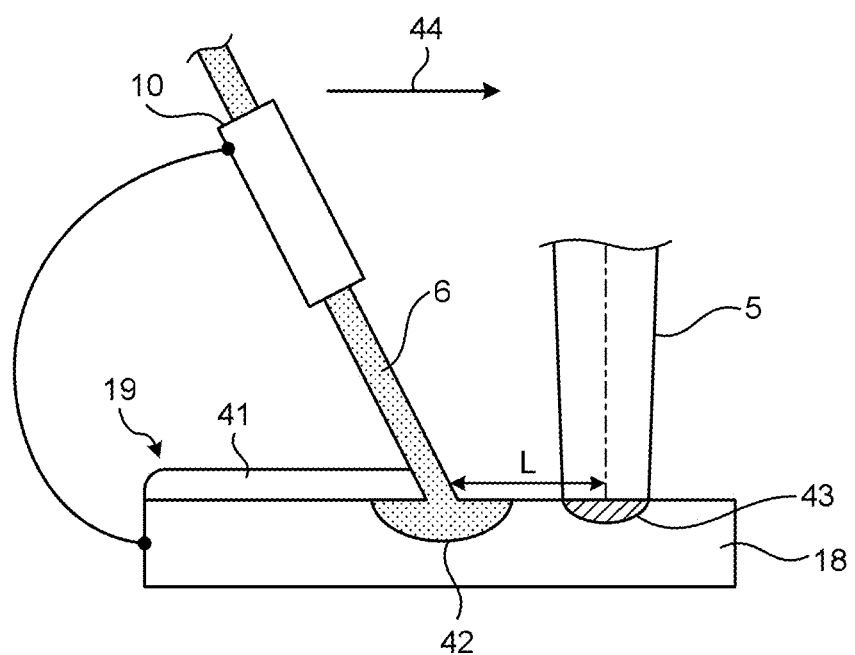
FIG. 3 is a diagram illustrating the additive manufacturing apparatus of FIG. 1 forming a bead.

A description is provided next of how the additive manufacturing apparatus 1 forms a bead. FIG. 3 is a diagram illustrating the additive manufacturing apparatus of FIG. 1 forming the bead. The bead 41 is a linear solidified object formed of the molten wire 6. The additive manufacturing apparatus 1 layers a plurality of the beads 41 on the base material 18, thus forming the formed object 19. FIG. 3 illustrates the first bead 41 being formed on the base material 18.

The additive manufacturing apparatus 1 shifts the feed position while repeatedly feeding and retracting the wire 6 to and from the feed position on the base material 18. The additive manufacturing apparatus 1 shifts the feed position and the irradiation position, with the irradiation position leading in spaced relation to the feed position in a moving direction 44 along which the feed position is shifted.

The CMT power supply 11 generates an arc between the wire 6 and the base material 18 by applying a pulse voltage between the wire 6 and the base material 18. The additive manufacturing apparatus 1 melts the base material 18 with the arc, thus forming a molten pool 42 in the base material 18. The feed mechanism 7 feeds the wire 6 to the molten pool 42 in synchronization with the arc generation. The wire 6 is heated with the passage of the current through the wire 6. The arc goes out when a molten droplet of the wire 6 contacts the molten pool 42. When the arc goes out, the CMT power supply 11 reduces the current to a minimum.

After the droplet contacts the molten pool 42, the feed mechanism 7 retracts the wire 6. Retracting the wire 6 disconnects the droplet in contact with the molten pool 42 from the wire 6. When the droplet is disconnected from the wire 6, a short circuit between the base material 18 and the wire 6 is cleared, and the CMT power supply 11 increases the current for arc generation. The additive manufacturing apparatus 1 repeats this operation while shifting the feed position for the wire 6, thus forming the bead 41 on the base material 18. When forming another bead 41 on the above bead 41, the additive manufacturing apparatus 1 performs a similar operation to that the additive manufacturing apparatus 1 performs when forming the above bead 41 on the base material 18.

Since the bead 41 is formed by feeding the molten wire 6 to the molten pool 42, the width of the bead 41 is proportional to the size of the molten pool 42. The larger the molten pool 42, the wider the bead 41. If a cutting process is to follow the additive manufacturing using the wire 6, the formed object 19 needs to have a reduced wall thickness for the purpose of decreasing a burden on cutting. Therefore, heat input conditions may be applied for making the bead 41 thinner. A problem in that case is that when the base material 18 has a greater thermal capacity, or when heat is extracted from the base material 18 at a faster rate, the molten pool 42 becomes shallower, making it easier for the bead 41 to separate.

The additive manufacturing apparatus 1 preheats an area 43 of the base material 18 by irradiating the base material 18 with the laser beam 5, which serves as an auxiliary heat source. By preheating the base material 18, the additive manufacturing apparatus 1 improves wettability of the base material 18. By improving the wettability of the base material 18, the additive manufacturing apparatus 1 is capable of controlling the separation of the bead 41. Consequently, the additive manufacturing apparatus 1 is capable of stable formation of the thinner bead 41 even when the molten pool 42 is smaller.

A description is provided here of the relation between the feed position for the wire 6 and the irradiation position for the laser beam 5. If the molten pool 42 is irradiated directly with the laser beam 5, increased heat is input to the base material 18, making the molten pool 42 larger. With the larger molten pool 42, the bead 41 that is formed is thicker. Moreover, when the wire 6 is in contact with the molten pool 42, the heat from the base material 18 is transmitted to the wire 6, causing the wire 6 to melt excessively. The excessive melting of the wire 6 makes controlled feeding and retraction of the wire 6 difficult, so that the wire 6 is not fed and retracted stably. The additive manufacturing apparatus 1 irradiates the position ahead of the feed position in the moving direction 44 with the laser beam 5, thus improving the wettability and preventing excessive heat from being input to the base material 18.

A distance L refers to a distance between a center of the feed position for the wire 6 and a center of the irradiation position for the laser beam 5. If the distance L is too short, the molten pool 42 problematically becomes larger, and the wire 6 problematically melts excessively. If the distance L is too long, preheating the base material 18 has an insufficient effect. Therefore, the distance L ranges from 1.0 to 2.0 times of a spot diameter of the laser beam 5 on the workpiece. This enables the additive manufacturing apparatus 1 to form the smaller molten pool 42 and prevent the wire 6 from melting excessively. The additive manufacturing apparatus 1 is also enabled to improve the wettability by preheating the base material 18. The additive manufacturing apparatus 1 is capable of accurate control of the irradiation position and thus is capable of accurate position control of the area 43 to be preheated. Through the accurate position control of the area 43, the additive manufacturing apparatus 1 is capable of improving the wettability of the base material 18 while controlling the heat input to the entire base material 18.

By controlling the heat input to the base material 18, the additive manufacturing apparatus 1 prevents or decreases strains in the formed object 19 due to thermal shrinkage after forming. Since the strains in the formed object 19 are prevented or decreased, the additive manufacturing apparatus 1 is capable of higher precision forming. The laser oscillator 2 of the additive manufacturing apparatus 1 does not need to be a high-power laser oscillator for forming the molten pool 42. The higher the output power, the more expensive the laser oscillator is. Therefore, the additive manufacturing apparatus 1 that requires no high-power laser oscillator is enabled to have a low-cost configuration.

Melting the wire 6 by irradiating the wire 6 with the laser beam 5 may have a problem in that the wire 6 is difficult to melt when the wire 6 has a low absorption for the laser beam 5. In the first embodiment, the wire 6 is melted by the passage of the current through the wire 6, so that this problem is avoidable. A given example of the wire 6 that has a low absorption for the laser beam 5 is made of, for example, aluminum or copper.

A description is provided next of a hardware configuration of the control device 12. The control device 12 is functionally implemented with processing circuitry. The processing circuitry is dedicated hardware installed in the control device 12. The processing circuitry may be a processor that executes programs stored in a memory.

Figure 4:
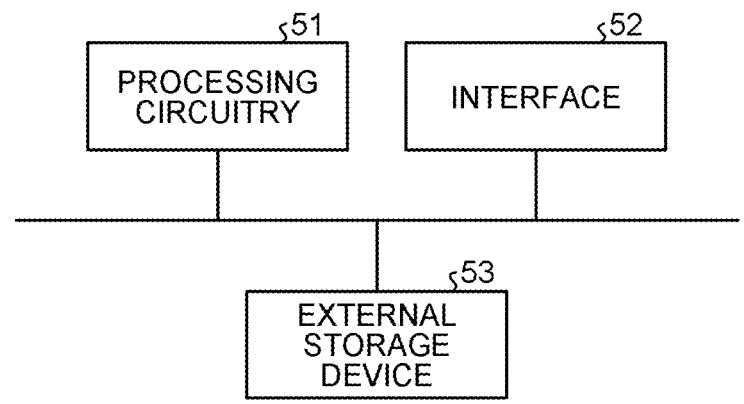
FIG. 4 is a diagram illustrating a first example of a hardware configuration of the control device according to the first embodiment.

FIG. 4 is a diagram illustrating a first example of the hardware configuration of the control device according to the first embodiment. In the hardware configuration illustrated in FIG. 4, the control device 12 is functionally implemented with dedicated hardware. The control device 12 includes processing circuitry 51 that executes various processes, an interface 52 that provides connection with a device external to the control device 12 or inputs and outputs information, and an external storage device 53 that stores information.

The processing circuitry 51 serves as the dedicated hardware and is a single circuit, a composite circuit, a programmed processor, a parallel programmed processor, an application-specific integrated circuit (ASIC), a field-programmable gate array (FPGA), or a combination of these. The program analysis unit 32, the condition setting unit 34, and the command generation unit 35 that are illustrated in FIG. 2 are functionally implemented with the processing circuitry 51. The processing program 31 and the processing condition table 33 are stored in the external storage device 53. The various commands that are generated by the command generation unit 35 are output respectively to the parts from the interface 52.

Figure 5:
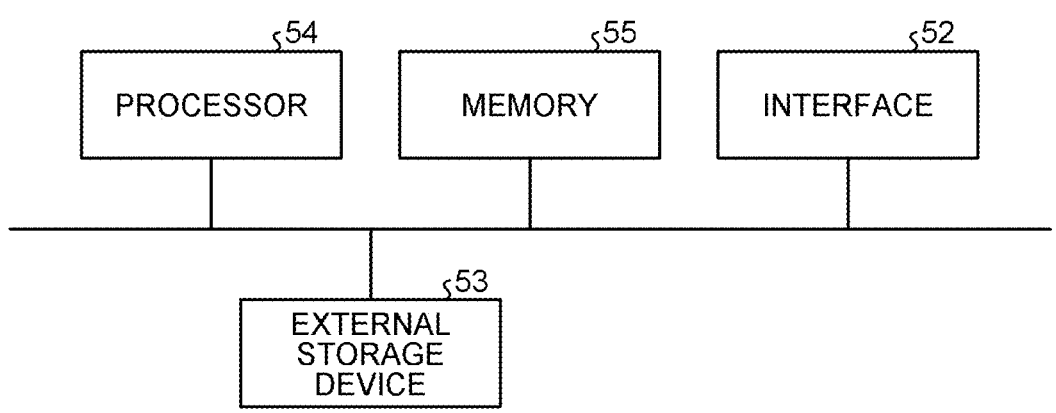
FIG. 5 is a diagram illustrating a second example of the hardware configuration of the control device according to the first embodiment.

FIG. 5 is a diagram illustrating a second example of the hardware configuration of the control device according to the first embodiment. In the hardware configuration illustrated in FIG. 5, the control device 12 is functionally implemented with hardware that executes programs.

A processor 54 is a central processing unit (CPU), a processing unit, an arithmetic unit, a microprocessor, a microcomputer, or a digital signal processor (DSP). The program analysis unit 32, the condition setting unit 34, and the command generation unit 35 that are illustrated in FIG. 2 are functionally implemented with the processor 54 and software, firmware, or a combination of software and firmware. The software or the firmware is described as the programs and is stored in a memory 55 serving as a built-in memory. The memory 55 is a nonvolatile or volatile semiconductor memory such as a random-access memory (RAM), a read-only memory (ROM), a flash memory, an erasable programmable read-only memory (EPROM), or an electrically erasable programmable read-only memory (EEPROM) (registered trademark).

The additive manufacturing apparatus 1 according to the first embodiment shifts the feed position and the irradiation position, with the irradiation position leading in the moving path for the feed position in spaced relation to the feed position. Therefore, the additive manufacturing apparatus 1 produces an effect where it is possible to perform higher precision forming.

Second Embodiment

Figure 6:
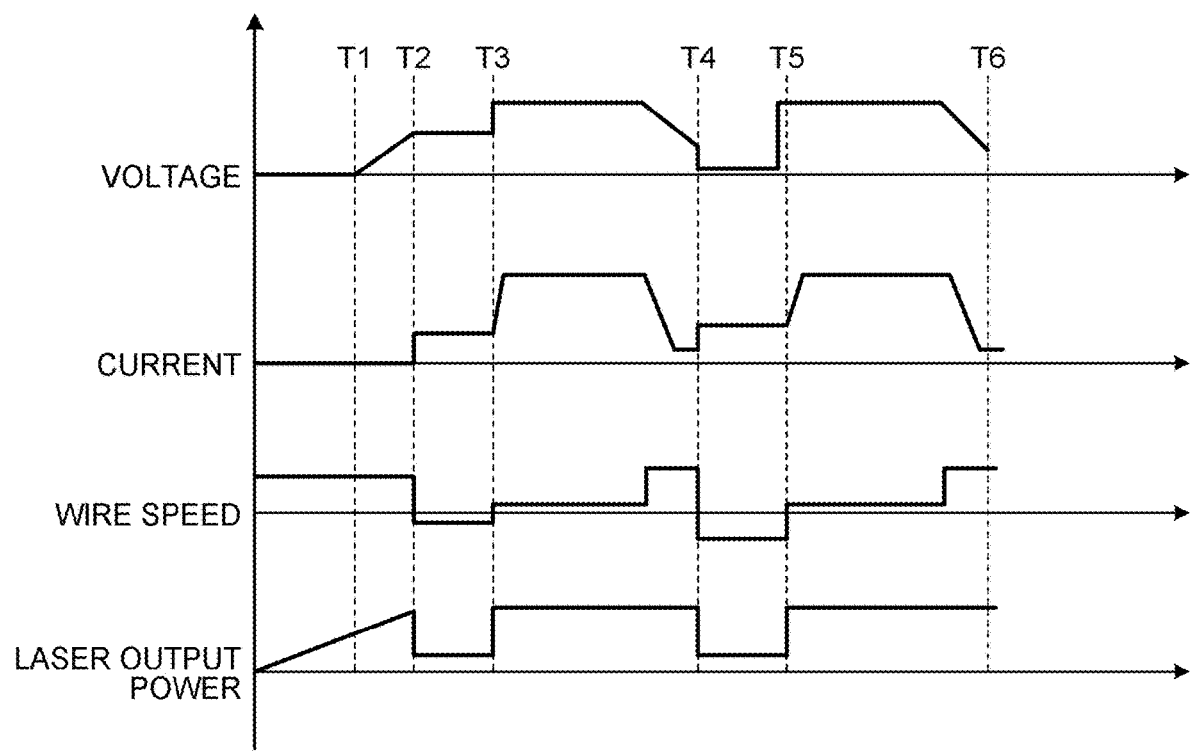
FIG. 6 is a diagram illustrating how an additive manufacturing apparatus according to a second embodiment of the present invention operates.
Figure 7:
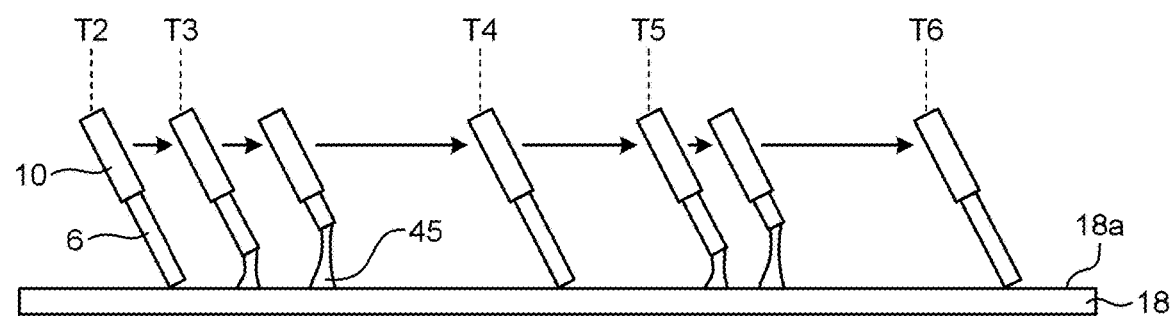
FIG. 7 is a diagram illustrating wire feeding in the additive manufacturing apparatus according to the second embodiment.

FIG. 6 is a diagram illustrating how an additive manufacturing apparatus according to a second embodiment of the present invention operates. FIG. 7 is a diagram illustrating wire feeding in the additive manufacturing apparatus according to the second embodiment. The operation of the additive manufacturing apparatus 1 according to the second embodiment is described with reference to the above-described configuration of the additive manufacturing apparatus 1 according to the first embodiment.

FIG. 6 illustrates how voltage that is applied between the wire 6 and a workpiece, current that flows through the wire 6, wire speed, and laser output power change. The wire speed refers to feeding speed of the wire 6. The laser output power refers to output power of the laser beam 5 from the laser oscillator 2. While FIG. 6 illustrates times T1 to T6, FIG. 7 illustrates state changes of the wire 6 between time T2 and time T6. FIG. 7 does not illustrate the bead 41 that is formed as the wire 6 is fed.

The output of the laser beam 5 from the laser oscillator 2 and the feeding of the wire 6 by the feed mechanism 7 occur at the same time before time T1. Here the wire 6 is not yet in contact with the base material 18. Before the wire 6 comes into contact with a surface 18a of the base material 18, the CMT power supply 11 applies the voltage between the wire 6 and the base material 18 at time T1.

At time T2, a leading end of the wire 6 contacts the surface 18a. As the wire 6 contacts with the surface 18a, the current flows through the wire 6. At time T2, the laser oscillator 2 decreases the laser output power. Alternatively, the laser oscillator 2 may stop the laser output power at time T2. In this way, propagation of excess heat from the laser beam 5 to the wire 6 through the base material 18 can be prevented in the presence of a short circuit between the wire 6 and the base material 18. Whether to decrease or stop the laser output power at time T2 can be determined in accordance with thermal capacity of the base material 18 or a rate at which heat is extracted from the base material 18. At time T2, the feed mechanism 7 switches its operation from feeding the wire 6 to retracting the wire 6. From time T2, the wire 6 is gradually retracted with the voltage being applied. From time T2 to time T3, the wire 6 and the base material 18 short-circuit.

At time T3, an arc 45 is generated between the leading end of the wire 6 and the surface 18a. The additive manufacturing apparatus 1 generates the arc 45 to form the molten pool 42 in the base material 18. FIG. 7 does not illustrate the molten pool 42. At time T3, the CMT power supply 11 increases the current. At time T3, the laser oscillator 2 increases the laser output power. When the arc 45 is to be generated, the laser oscillator 2 increases the laser output power in association with an increase in the voltage being applied between the workpiece and the wire 6. The control device 12 may provide control that increases the laser output power as the increase in the voltage is detected. The increase in the voltage is detected by the CMT power supply 11.

At time T3, the feed mechanism 7 switches its operation from retracting the wire 6 to feeding the wire 6. Since the leading end of the wire 6 is separate from the surface 18a, the heat from the laser beam 5 does not propagate through the base material 18 to the wire 6. Because of the current flowing through the wire 6, the wire 6 is heated. The wire 6 melts and thus forms a droplet that comes into contact with the molten pool 42. The base material 18 is preheated by the laser beam 5, so that the additive manufacturing apparatus 1 enables the bead 41 to be formed on the base material 18 having improved wettability.

As the wire 6 melts, a distance between the base material 18 and the wire 6 increases. Accordingly, the additive manufacturing apparatus 1 increases the wire speed at a timing of a decrease in the voltage. At time T4, the leading end of the wire 6 contacts the surface 18a. The arc 45 ends at time T4. At time T4, the laser oscillator 2 decreases or stops the laser output power as the laser oscillator 2 has done at time T2. At time T4, the feed mechanism 7 switches its operation from feeding the wire 6 to retracting the wire 6 as the feed mechanism 7 has done at time T2. The arc 45 occurs between time T3 and time T4.

From time T5 on, the additive manufacturing apparatus 1 repeats the operation that the additive manufacturing apparatus 1 has performed from time T2 to time T4. From time T4 to time T5, the wire 6 and the base material 18 short-circuit. The arc 45 occurs between time T5 and time T6.

The additive manufacturing apparatus 1 according to the second embodiment decreases the laser output power when the wire 6 contacts the workpiece, and increases the laser output power when the wire 6 is separated from the workpiece. The additive manufacturing apparatus 1 is capable of preventing the propagation of excess heat from the laser beam 5 to the wire 6 through the base material 18. Therefore, the additive manufacturing apparatus 1 produces an effect where it is possible to perform higher precision forming.

Third Embodiment

Figure 8:
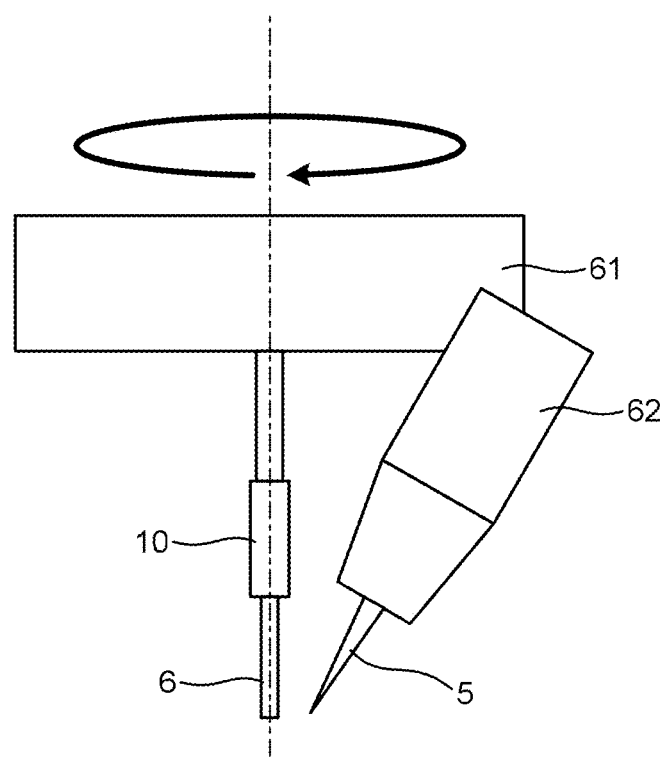
FIG. 8 is a side view of a machining head of an additive manufacturing apparatus according to a third embodiment of the present invention.
Figure 9:
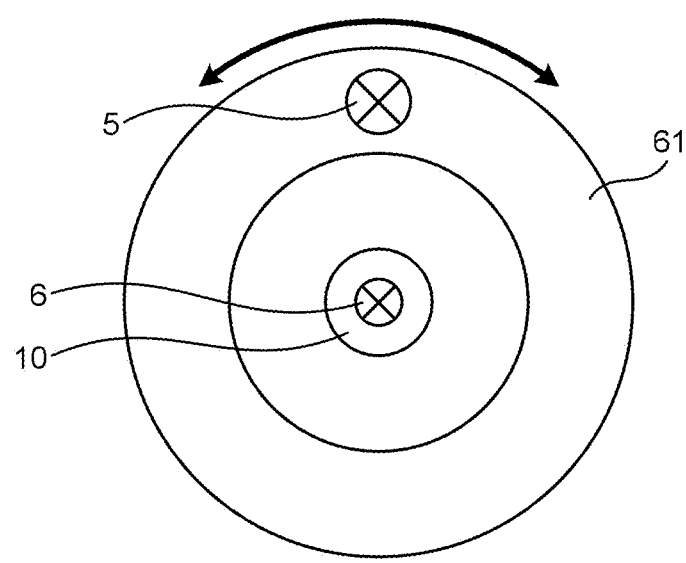
FIG. 9 is a diagram illustrating a feed position and an irradiation position in a view looking down at the machining head illustrated in FIG. 8.

FIG. 8 is a side view of a machining head of an additive manufacturing apparatus according to a third embodiment of the present invention. FIG. 9 is a diagram illustrating a feed position and an irradiation position in a view looking down at the machining head illustrated in FIG. 8. The additive manufacturing apparatus 1 according to the third embodiment is capable of shifting the irradiation position for the laser beam 5 along a circumference of a circle having the feed position for the wire 6 at its center. In the third embodiment, constituent elements identical with those in the above-described first and second embodiments have the same reference characters, and a description is provided mainly of difference from the first and second embodiments. FIG. 9 illustrates a cross section of the wire 6 being fed to the feed position and a spot of the laser beam 5 at the irradiation position.

A machining head 61 includes a beam nozzle 62 that emits the laser beam 5 toward a workpiece. The machining head 61 has a cylindrical shape. The machining head 61 rotates about a central axis of the cylindrical shape. The wire 6 is fed to the workpiece along this central axis. The feed position for the wire 6 is aligned with this central axis. The laser beam 5 from the beam nozzle 62 is emitted obliquely relative to this central axis. As the machining head 61 rotates, the beam nozzle 62 moves along the circumference of the circle having the feed position for the wire 6 at the center. In other words, the machining head 61 shifts the irradiation position by rotating. The machining head 61 moves along each of three axes as in the first embodiment. As in the first embodiment, the additive manufacturing apparatus 1 shifts the feed position and the irradiation position, with the irradiation position leading in spaced relation to the feed position in the moving direction 44, along which the feed position is shifted.

Figure 10:
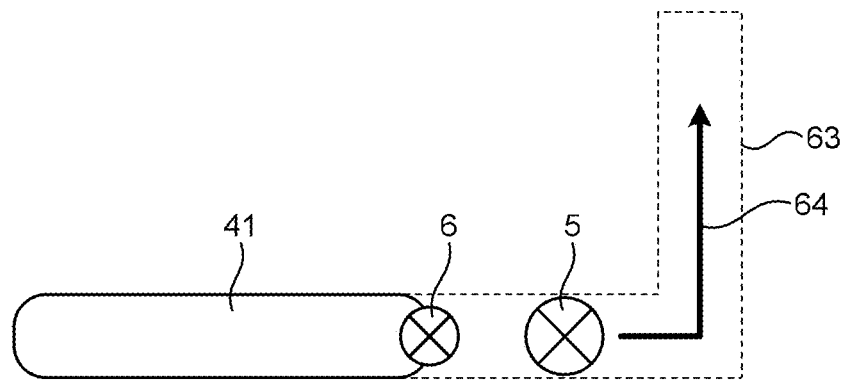
FIG. 10 is a diagram illustrating an example showing the feed position and the irradiation position that are illustrated in FIG. 9 in a moving path for the feed position.

FIG. 10 is a diagram illustrating an example showing the feed position and the irradiation position that are illustrated in FIG. 9 in a moving path for the feed position. FIG. 10 illustrates the cross section of the wire 6 being fed to the feed position and the spot of the laser beam 5 at the irradiation position. The moving path 63 illustrated in FIG. 10 includes a bend.

In a straight part of the moving path 63, the irradiation position is shifted in the same direction as the direction in which the feed position is shifted by the additive manufacturing apparatus 1, whereby the additive manufacturing apparatus 1 shifts the irradiation position ahead of the feed position. In the bend of the moving path 63, in order to shift the irradiation position along the moving path 63, the additive manufacturing apparatus 1 needs to change the direction in which the irradiation position is shifted relative to the direction in which the feed position is shifted. When a moving direction 64 varies as in the bend, the machining head 61 of the additive manufacturing apparatus 1 is rotated to shift the irradiation position in accordance with the varying moving direction 64.

Figure 11:
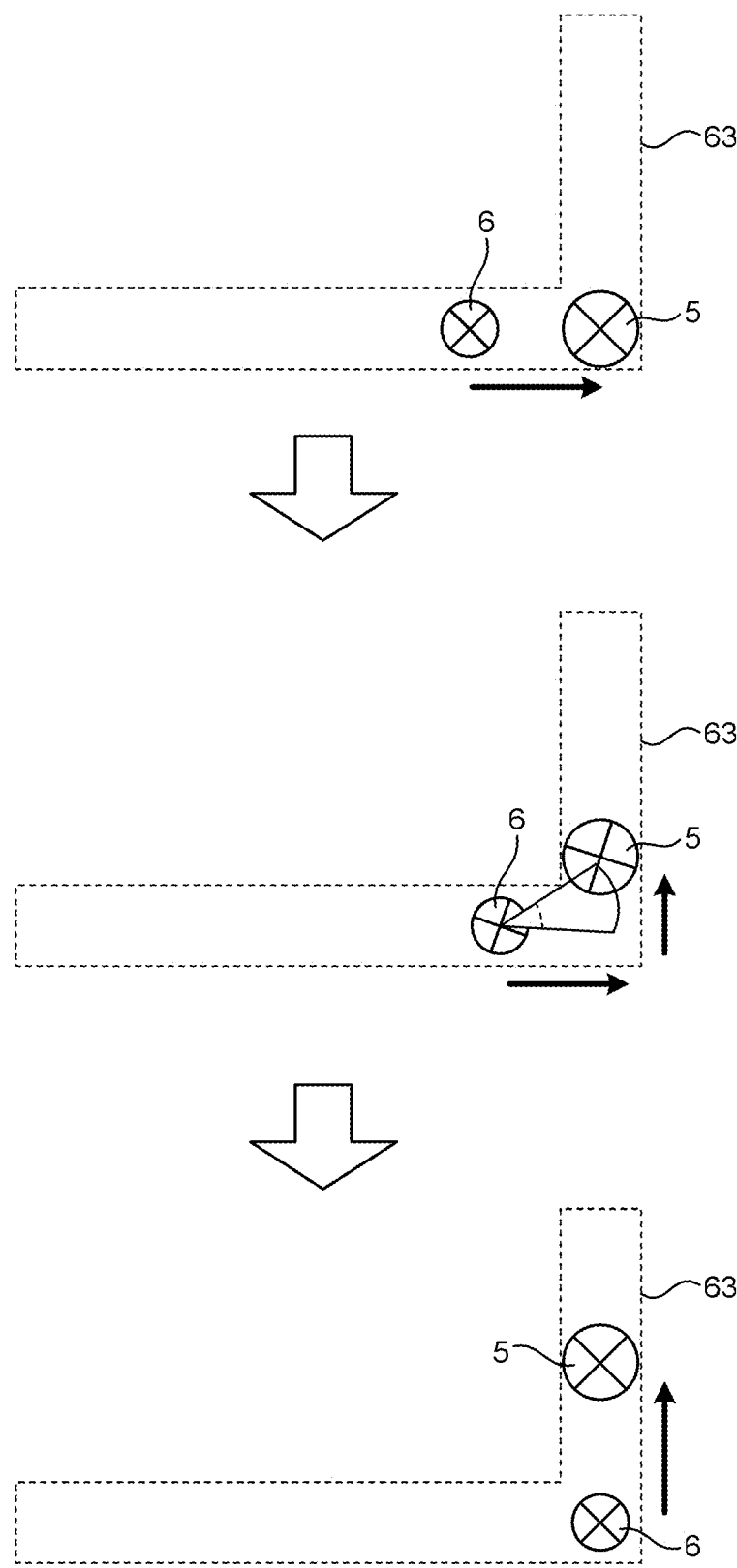
FIG. 11 is a diagram illustrating how the feed position and the irradiation position that are illustrated in FIG. 10 are shifted.

FIG. 11 is a diagram illustrating how the feed position and the irradiation position that are illustrated in FIG. 10 are shifted. FIG. 11 illustrates the cross section of the wire 6 being fed to the feed position and the spot of the laser beam 5 at the irradiation position. A top part of FIG. 11 illustrates the irradiation position reaching the bend while shifting ahead of the feed position in the moving direction 64. The machining head 61 rotates while continuing its movement toward the bend along with the feed position. A middle part of FIG. 11 illustrates the irradiation position traveling in the varied direction, which agrees with the varied moving direction 64. Therefore, the additive manufacturing apparatus 1 shifts the irradiation position along the moving path 63.

A bottom part of FIG. 11 illustrates the feed position reaching the bend. As the feed position reaches the bend, the machining head 61 stops rotating. The additive manufacturing apparatus 1 changes the direction in which the machining head 61 is moved to agree with a varied direction in which the feed position is to be shifted. Thus, the irradiation position is shifted in the same direction as the direction in which the feed position is shifted by the additive manufacturing apparatus 1. The additive manufacturing apparatus 1 is also capable of maintaining a fixed distance between the irradiation position and the feed position while the irradiation position and the feed position pass along the bend.

From the time that the irradiation position reaches the bend to the time that the feed position reaches the bend, the irradiation position and the feed position shift at the same speed. The additive manufacturing apparatus 1 controls the rotation of the machining head 61 such that angular velocity of the rotating machining head 61 includes a velocity component "r sin θ/t" in the moving direction 64 that equals the shifting speed of the feed position. Here "r" represents a radius of rotation, "θ" represents a rotation angle, and "t" represents time.

The command generation unit 35 of the control device 12 includes a rotation command generation unit that generates a rotation command for rotating the machining head 61 in accordance with the varying moving direction 64. The rotation command generation unit outputs the generated rotation command to the machining head 61. The rotation command generation unit according to the third embodiment is not illustrated.

The additive manufacturing apparatus 1 according to the third embodiment is capable of shifting the irradiation position along the circumference of the circle that has the feed position at its center, so that the irradiation position is shifted along the varying moving direction 64. Therefore, the additive manufacturing apparatus 1 is capable of shifting the feed position and the irradiation position, with the irradiation position leading in the moving path 63 for the feed position in spaced relation to the feed position.

Fourth Embodiment

Figure 12:
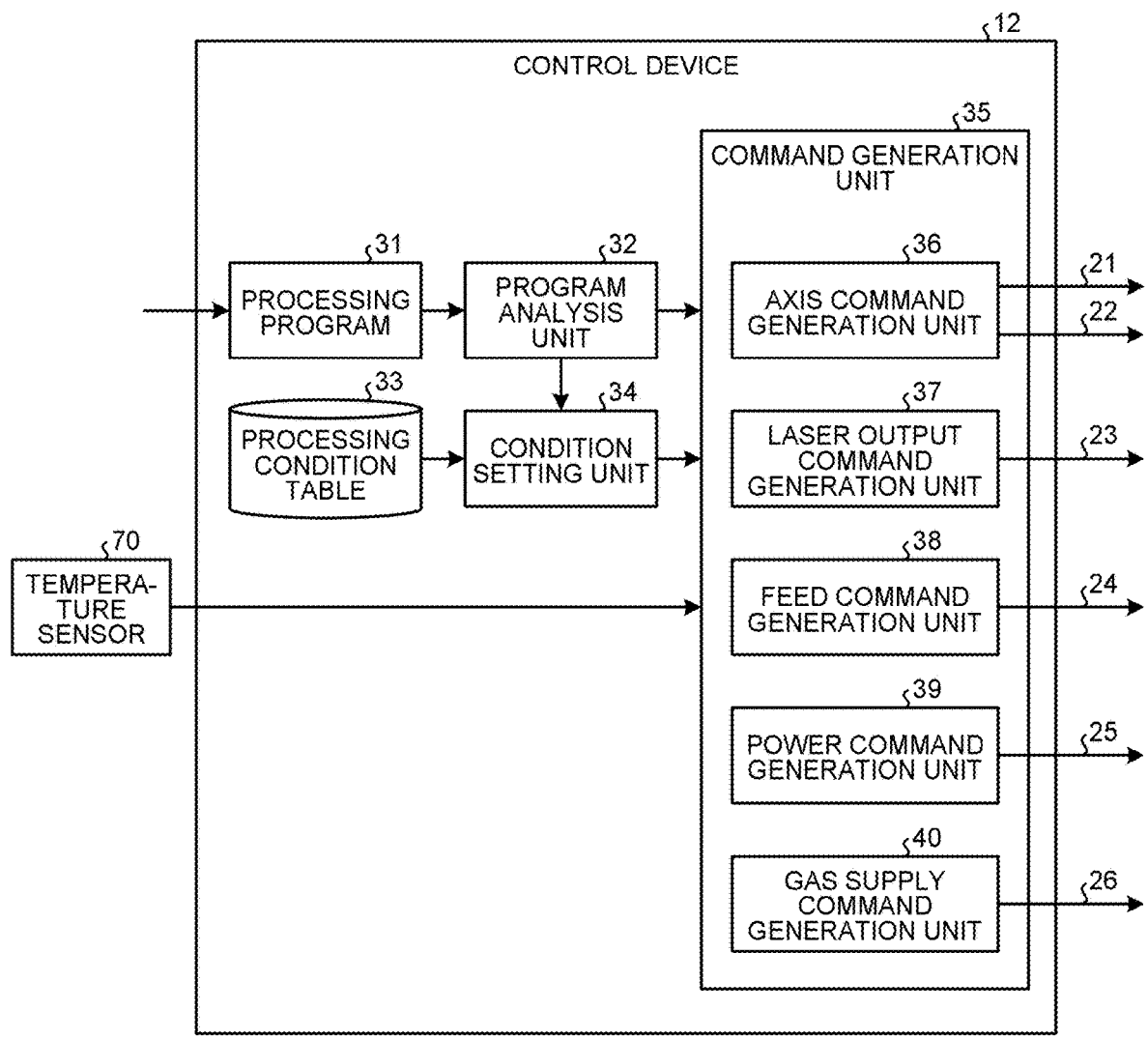
FIG. 12 is a diagram illustrating a function configuration of a control device included in an additive manufacturing apparatus according to a fourth embodiment of the present invention.

FIG. 12 is a diagram illustrating a function configuration of a control device included in an additive manufacturing apparatus according to a fourth embodiment of the present invention. The additive manufacturing apparatus 1 according to the fourth embodiment adjusts heating of a workpiece by irradiation with the laser beam 5 on the basis of a temperature measurement result of the workpiece. In the fourth embodiment, constituent elements identical with those in the above-described first through third embodiments have the same reference characters, and a description is provided mainly of difference from the first through third embodiments.

The additive manufacturing apparatus 1 includes a temperature sensor 70 that measures temperature of the workpiece. The temperature sensor 70 measures the temperature of the workpiece at the feed position for the wire 6 or a position ahead of the feed position in the moving direction 44 or 64 for the feed position. The temperature sensor 70 to use can be a device such as a radiation thermometer or an infrared thermography device.

The temperature sensor 70 outputs the temperature measurement result to the command generation unit 35. If the measurement result from the temperature sensor 70 is lower than a threshold, the command generation unit 35 adjusts its command to increase heat input to the workpiece. If the measurement result from the temperature sensor 70 is higher than the threshold, the command generation unit 35 adjusts its command to reduce the heat input to the workpiece. The threshold is preset.

When the heat input to the workpiece is to be increased, the laser output command generation unit 37 generates the laser output command 23 that increases the laser output power. When the heat input to the workpiece is to be reduced, the laser output command generation unit 37 generates the laser output command 23 that decreases the laser output power. When the heat input to the workpiece is to be increased, the axis command generation unit 36 alternatively generates the axis command 21 that slows down the machining head 4 and the contact tip 10. When the heat input to the workpiece is to be reduced, the axis command generation unit 36 alternatively generates the axis command 21 that speeds up the machining head 4 and the contact tip 10. As described above, the additive manufacturing apparatus 1 adjusts heating of the workpiece by the irradiation with the laser beam 5 on the basis of the temperature of the workpiece. By adjusting heating of the workpiece, the additive manufacturing apparatus 1 is capable of stable formation of the bead 41.

The additive manufacturing apparatus 1 according to the fourth embodiment adjusts the heating of the workpiece on the basis of the temperature of the workpiece and is thus capable of stably forming the bead 41. Therefore, the additive manufacturing apparatus 1 produces an effect where it is possible to perform higher precision forming. If the additive manufacturing apparatus 1 has the rotatable machining head 61 as in the third embodiment, the additive manufacturing apparatus 1 may adjusts heating of a workpiece based on a temperature measurement result of the workpiece.

The above configurations illustrated in the embodiments are illustrative of contents of the present invention, can be combined with other techniques that are publicly known, and can be partly omitted or changed without departing from the gist of the present invention.

REFERENCE SIGNS LIST 1 additive manufacturing apparatus; 2 laser oscillator; 3 fiber cable; 4, 61 machining head; 5 laser beam; 6 wire; 7 feed mechanism; 8 rotary motor; 9 wire spool; 10 contact tip; 11 CMT power supply; 12 control device; 13 head drive unit; 14 gas injection device; 15 pipe; 16 gas; 17 rotating shafts; 18 base material; 18a surface; 19 formed object; 20 stage; 21 axis command; 22 rotation command; 23 laser output command; 24 feed command; 25 power command; 26 gas supply command; 31 processing program; 32 program analysis unit; 33 processing condition table; 34 condition setting unit; 35 command generation unit; 36 axis command generation unit; 37 laser output command generation unit; 38 feed command generation unit; 39 power command generation unit; 40 gas supply command generation unit; 41 bead; 42 molten pool; 43 area; 44, 64 moving direction; 45 arc; 51 processing circuitry; 52 interface; 53 external storage device; 54 processor; 55 memory; 62 beam nozzle; 63 moving path; 70 temperature sensor.

The invention claimed is:

1. An additive manufacturing apparatus to form layers with a material that is molten to produce a formed object, the additive manufacturing apparatus comprising:
a power supply to supply a current to the material, the current being used for heating the material that is fed to a workpiece;
a beam source to produce a beam with which the workpiece is irradiated;
a control device including processing circuitry; and
a drive unit including rotating shafts and configured to shift a feed position for the material on the workpiece and an irradiation position for the beam on the workpiece, wherein
the control device is configured to control the drive unit to shift the feed position and the irradiation position, with the irradiation position leading in a moving path for the feed position in spaced relation to the feed position, and
the control device is further configured to control the beam source to increase output power of the beam in association with an increase in voltage being applied between the workpiece and the material, wherein a distance between a center of the feed position and a center of the irradiation position ranges from 1.0 to 2.0 times of a spot diameter of the beam on the workpiece.

2. The additive manufacturing apparatus according to claim 1, wherein the beam source decreases or stops output power of the beam when the material contacts the workpiece.

3. The additive manufacturing apparatus according to claim 1, wherein the irradiation position is capable of being shifted along a circumference of a circle having the feed position at a center of the circle.

4. The additive manufacturing apparatus according to claim 3, comprising
a machining head including a beam nozzle to emit the beam toward the workpiece, wherein
the machining head shifts the irradiation position while rotating in a direction along the circumference.

5. The additive manufacturing apparatus according to claim 1, wherein heating of the workpiece by irradiation with the beam is adjusted based on a temperature measurement result of the workpiece.

* * * * *